US010769630B2

(12) United States Patent
Modi

(10) Patent No.: US 10,769,630 B2
(45) Date of Patent: Sep. 8, 2020

(54) MOBILE PERSON TO PERSON VOICE PAYMENT

(71) Applicant: MasterCard International Incorporated, Purchase, NY (US)

(72) Inventor: Rohit Modi, New Delhi (IN)

(73) Assignee: Mastercard International Incorporated, Purchase, NY (US)

( * ) Notice: Subject to any disclaimer, the term of this patent is extended or adjusted under 35 U.S.C. 154(b) by 867 days.

(21) Appl. No.: 15/151,826

(22) Filed: May 11, 2016

(65) Prior Publication Data

US 2017/0330183 A1 Nov. 16, 2017

(51) Int. Cl.
G06Q 40/00 (2012.01)
G06Q 20/40 (2012.01)
(Continued)

(52) U.S. Cl.
CPC .......... *G06Q 20/401* (2013.01); *G06Q 20/10* (2013.01); *G06Q 20/223* (2013.01);
(Continued)

(58) Field of Classification Search
CPC .... G06Q 20/401; G06Q 20/10; G06Q 20/223; G06Q 20/3223; G06Q 20/4012; G06Q 20/40145
See application file for complete search history.

(56) References Cited

U.S. PATENT DOCUMENTS 8,204,180 B1 * 6/2012 Narayanan .......... G06F 21/6245
345/626
8,275,115 B1 * 9/2012 Everingham ....... H04M 3/5166
379/265.01
(Continued)

FOREIGN PATENT DOCUMENTS

WO WO-2008027621 A1 * 3/2008 .......... G06Q 20/102
WO 2008/073057 A1 6/2008
(Continued)

OTHER PUBLICATIONS

Karnouskos et al., "Mobile Payment: A Journey through existing Procedures and Standardization Initiatives," IEEE Communications Surveys & Tutorials (Year: 2004).*
(Continued)

*Primary Examiner* — Alexander G Kalinowski
*Assistant Examiner* — William B. Bunker
(74) *Attorney, Agent, or Firm* — Buckley, Maschoff & Talwalker LLC

(57) ABSTRACT

Methods, systems and apparatus for conducting mobile device person-to-person voice payments. An embodiment includes a mobile device processor of a mobile device detecting a first key entry by a sender during a mobile telephone call, muting the call, prompting the sender to enter persons-to-person (P2P) security data and a payment amount, and detecting a second key entry. The mobile device processor then prompts the sender to provide voice data associated with a password, detects a third key entry, and then transmits a P2P payment request including the P2P security data, the payment amount, the voice data, sender account data, and a recipient mobile telephone number, to a mobile person-to-person (P2P) computer. The mobile device processor then unmutes the mobile telephone call and receives a P2P payment message from the mobile P2P computer.

14 Claims, 3 Drawing Sheets

(51) Int. Cl.
*G06Q 20/32* (2012.01)
*G06Q 20/10* (2012.01)
*G06Q 20/22* (2012.01)

(52) U.S. Cl.
CPC ..... *G06Q 20/3223* (2013.01); *G06Q 20/3226* (2013.01); *G06Q 20/4012* (2013.01); *G06Q 20/40145* (2013.01)

(56) References Cited

U.S. PATENT DOCUMENTS

| | | | | |
|---|---|---|---|---|
| 2007/0255620 | A1* | 11/2007 | Tumminaro | G06Q 20/385 |
| | | | | 705/14.27 |
| 2009/0070263 | A1* | 3/2009 | Davis | G06Q 20/322 |
| | | | | 705/44 |
| 2011/0196797 | A1* | 8/2011 | Liwerant | G06Q 20/32 |
| | | | | 705/71 |
| 2012/0116967 | A1* | 5/2012 | Klein | G06Q 40/02 |
| | | | | 705/42 |
| 2012/0173421 | A1 | 7/2012 | Fujii | |
| 2013/0124416 | A1* | 5/2013 | Pawar | G06Q 20/10 |
| | | | | 705/44 |
| 2014/0254778 | A1 | 9/2014 | Zeppenfeld et al. | |
| 2014/0279457 | A1 | 9/2014 | Green et al. | |
| 2015/0127538 | A1* | 5/2015 | Tew | H04M 3/38 |
| | | | | 705/44 |
| 2016/0007195 | A1* | 1/2016 | Goldstone | H04L 63/0884 |
| | | | | 455/411 |
| 2017/0024740 | A1* | 1/2017 | Todasco | G06Q 20/4014 |
| 2017/0352032 | A1* | 12/2017 | Mohsenzadeh | G06Q 20/00 |

FOREIGN PATENT DOCUMENTS

| | | | |
|---|---|---|---|
| WO | 2009/136163 A2 | 11/2009 | |
| WO | WO-2015183412 A1 * | 12/2015 | ........... G06Q 20/204 |

OTHER PUBLICATIONS

"PCT Notification of Transmittal of the International Search Report and the Written Opinion", International Searching Authority, dated Jul. 24, 2017 (Jul. 24, 2017), for International Application No. PCT/US2017/031711, 16pgs.

* cited by examiner

MOBILE PERSON TO PERSON VOICE PAYMENT

FIELD OF THE INVENTION

Exemplary embodiments described herein generally relate to methods and systems for facilitating a mobile device payment from a sender to a recipient, and more particularly to securely conducting payment from one mobile device to another mobile device (person-to-person) without disconnecting the mobile telephone call.

BACKGROUND

Wide adoption of credit cards, debit cards, electronic payment devices, online shopping systems, and online banking systems has resulted in few people carrying large sums of cash or writing many checks. People still need to transfer money to each other, however, for many different reasons. For example, a person may want to pay back a friend for money borrowed from that friend during a recent weekend night out, or a person may want to send money to a relative as a gift. Paying someone back or giving a gift of money to another person, however, can be difficult if you don't have the cash on hand and/or if the other person is not physically present with you. In such cases, a person may need to visit an automated teller machine (ATM) or mail the other person a check, both of which can be time consuming and/or inconvenient.

Processes exist for electronically transferring money from a sender's financial account to a recipient's financial account, however, such processes typically require the sender to know the recipient's financial account information so that the sender's bank can transfer money to the proper account. Most people do not know the financial account numbers of their friends and/or relatives, nor do most people want to provide their financial account numbers to others for privacy and/or security reasons.

Third party service providers have developed systems for making person-to-person payments, but these systems typically require persons to open a special type of financial account with an online entity, and create (and then remember) yet another username and password. In addition, in order to open up such an online person-to-person account, users are required to disclose confidential financial institution account information to the service provider company. In addition to taking some take time set up, such online person-to-person accounts are not always user-friendly, and in some cases do not provide adequate protections from being hacked or otherwise tampered with by a hacker and/or thief.

Therefore, a need exists for a convenient, user-friendly and secure person-to-person payment process and/or system wherein a caller can send payment to a recipient while conducting a mobile telephone conversation.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which.

Figure 1:
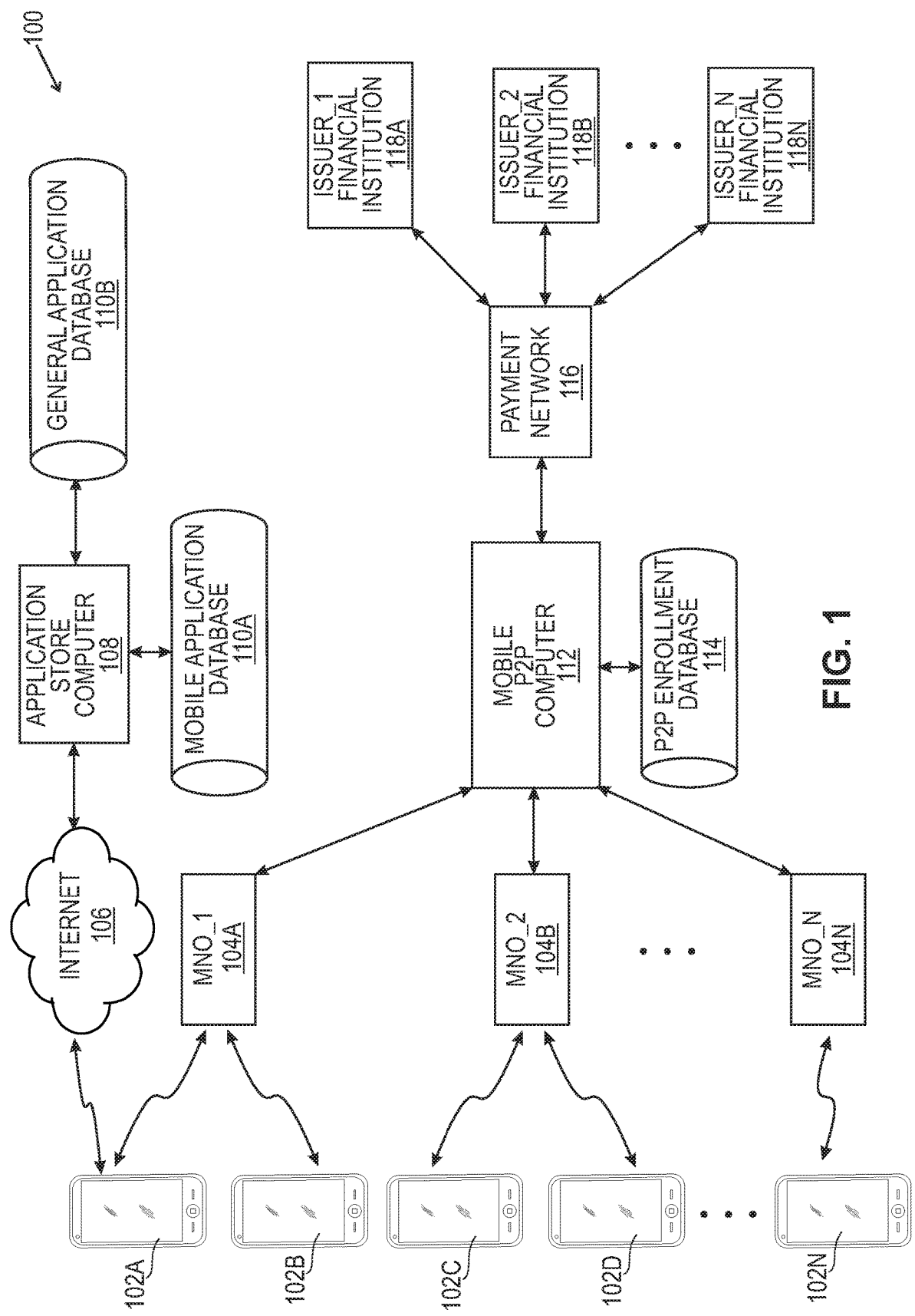
FIG. 1 is a block diagram illustrating a person-to-person mobile payment system in accordance with some embodiments of the disclosure.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In addition, in some cases well-known structures and processes are not shown or described in order not to obscure the description with unnecessary detail. Thus, the present disclosure is not intended to be limited to the embodiments shown, but is to be accorded the widest scope consistent with the principles and features disclosed herein.

In general, and for the purpose of introducing concepts of the present invention, one or more exemplary embodiments relate to a convenient, user-friendly and secure person-to-person (P2P) mobile device payment process and system. In particular, a caller (or sender) can securely transfer money from a financial account of the sender (which may be a mobile wallet associated with his or her mobile device) to a financial account of a recipient (which may be a mobile wallet of the recipient) during a voice call between the mobile devices. Thus, a sender may utilize his or her mobile device (such as a mobile telephone, Smartphone, tablet computer, or other portable device) to call a recipient's mobile device, and then during the mobile telephone call conduct a P2P payment without disconnecting the mobile telephone call. Accordingly, some embodiments relate to a secure P2P mobile payment service that enables a user of a mobile device to securely pay another mobile device user while engaged in a mobile telephone call (which may be a wireless (or cellular) call or a voice over Internet protocol (VOIP) voice call). Some embodiments require users (both senders and recipients) of the secure P2P mobile payment service to provide enrollment information in order to participate in such mobile device payment transactions. In addition, users such as persons and/or payment card account holders (cardholders) and/or consumers must provide verification data for security reasons in some implementations. It should also be understood that, in some implementations, a payment recipient may be an employee of a business or may be a merchant (or employee of a merchant) who utilizes a mobile device to obtain payment for goods and/or services from consumers.

As used herein, the term "wallet" or "mobile wallet" or "digital wallet" is used to refer to electronic data representing a collection of one or more payment instruments, which are typically offered by an issuer financial institution (FI), such as a consumer bank, to a consumer. A particular person or consumer may have multiple payment instruments (such as credit cards, debit cards, private label cards, loyalty cards, or the like) or "payment cards" where the payment card data has been provisioned by the payment card issuer (which may be financial institutions (FIs) such as banks) into the cardholder's mobile wallet resident in his or her mobile device. As another example, payment card account data may be added to a digital wallet by the cardholder via a third party entity with no integration with the issuer. In some embodiments, the cardholder specifies a particular payment card account resident in a particular digital wallet for use in conducting P2P payment transactions during an enrollment process.

Various exemplary embodiments are directed towards a mobile device-based, person-to-person (P2P) payment system that makes use of a mobile P2P voice payment application that has been downloaded and resides on the user's or sender's mobile device to allow for secure payments. In some other embodiments, a mobile P2P voice payment system may be operated by a telephone company utilizing software and/or processes resident on one or more telephone company server computers and/or operated by the telephone company. Such software and/or processes would enable, for example, users having feature phones (which do not contain applications) to make mobile P2P voice payments to recipients. In such a case, a user or sender may utilize the touch tone keys on his or her device to make a P2P voice payment after the sender has registered (as explained below) for the P2P voice payment service. Examples herein relate to the user experience such as for a consumer and/or cardholder and/or a business employee, whereby the consumer and/or cardholder is the sender and may initiate payment to another person (the recipient, who may be a friend or family member or an employee of a business, and the like) while utilizing a mobile device during a voice call to the other person.

In an example, after successful enrollment in the secure P2P mobile payment service, a user may be using his mobile telephone to talk to a friend on Saturday who, during the conversation, reminds the user that he owes her twenty dollars ($20.00) from the party both had attended last weekend. The user is a bit embarrassed because he forgot to repay his friend during the previous week, and therefore tells his friend to "Please hold the line—I'm going to mute the phone conversation and then electronically pay you back right now." In some embodiments disclosed herein, the user then presses a first key, which may be the star key (the "*" key) on his mobile device keypad (which may be a touch-screen), which signals the P2P voice payment application to cause the user's mobile device processor to place the friend on "Hold," which has the effect of muting the line without disconnecting the call. The friend now cannot hear anything that the user does or says until after the money transfer is accomplished, which ensures that any confidential information revealed by the user to conduct the payment transaction is not heard by the friend.

Continuing with the current example, following entry of the first key (the star key) the user enters a confidential four digit (4-digit) authorization password or personal identification number ("PIN"), such as the numbers "6546," followed by the amount of money to transfer in numbers or digits (in this example, by pushing numeric keys to equal twenty dollars and zero cents or "20.00"). After entering the money amount for the payment, the display screen of the user's mobile device shows:

*654620.00

If the user is satisfied that the numbers appearing on the display screen include the correct PIN and the correct amount of money, the user then presses a second key (which may again be the star key ("*") for the second time), which causes the P2P voice payment application to prompt the user to state the user's password (which may be a secret word or secret phrase) out loud into the microphone of the user's device followed by depressing a third key, such as the pound key. (For example, the secret word or secret phrase may be something as simple as the word "cat" or the phrase "red balloon," which word or phrase was pre-selected and provided by the user during an enrollment process). The prompt for voice data from the sender may be in the form of an audible prompt delivered through the sender's mobile device speaker such as: "Please say your P2P mobile payment password and then press pound." Alternately, or in addition, the same prompt may be displayed on the display screen of the mobile device as text. Thus, in this example, if the user pre-selected the word "cat" during the enrollment process as his P2P mobile payment password (or secret word), then at this point he states that word out loud into the speaker of his mobile device and then presses the pound key (or hash key: "#"). Depressing the pound key causes the numeric data and the voice data (for the word "cat") to be transmitted for payment processing to a remote mobile P2P computer. In addition, depression of the pound key causes the call to again go live, thus ending the "Hold" status and un-muting the line so that the user can again converse with his friend. At this point in the process, both the sender and the recipient assume that the mobile payment will be successful and carry on their mobile telephone conversation.

In some embodiments, the remote mobile P2P computer receives the user's security data, and if the PIN is correct and the voice data (of the sender saying the password) matches the stored voice sample of the sender, then the payment is authorized and twenty dollars is transferred immediately from the user's mobile wallet to the friend's mobile wallet. It should be understood that the mobile P2P computer utilizes both the secret password ("cat" in the above example) and the voice sample to verify that the person saying the password is the person who enrolled through that mobile telephone number. Thus, if someone else is using the sender's mobile telephone, for example, and happens to know the PIN and password, that person will not be able to successfully conduct a mobile P2P voice money transfer transaction because the voice data of that person will not match the stored voice sample that was provided by the sender when enrolling. Accordingly, when the sender says the password "cat" during the mobile P2P money transfer process two conditions need be satisfied. The first condition is that the password (for example, "cat" in this example) must match the password selected by the sender during the enrollment process, and the second condition is that the audio data of the person saying the password must match the stored voice sample which was provided during the enrollment process by the sender saying the password.

During enrollment, the user selected a mobile wallet to utilize and that mobile wallet is linked to the user's mobile telephone number (which is the same number that is being used in the telephone call example). Likewise, during enrollment the recipient selected her mobile wallet for use in the P2P voice payment service, and thus the recipient's mobile wallet is linked to her mobile telephone number (which is also being used during the current call example). Accordingly, in some implementations the mobile P2P computer can look-up the sender's mobile wall and the recipient's mobile wallet based on their respective mobile telephone numbers to conduct the mobile payment process.

In some implementations, the remote computer also transmits a mobile P2P payment message to both the sender's mobile device and to the recipient's mobile device. The mobile P2P payment message can be reviewed after the telephone call ends (when both parties disconnect from the call), or in some implementations the user (or sender) and his friend (or recipient) may both receive an SMS message (or a text message or the like) on their respective mobile devices indicating that the money transfer was either successful for the twenty dollar amount, or that it failed. In some cases, the SMS message or text message may be transmitted to and received by the user's (sender's) mobile device and/or the recipient's mobile device while the telephone call is still in progress, and thus may be checked by one or both parties while the call is ongoing. In most cases the mobile P2P payment message will confirm that the mobile payment was successful, and may include additional information such as the payment amount and the like.

In some cases, after the user presses the pound key (or hash key: "#"), which causes the numeric data and the voice data of the user to be transmitted for processing to a remote computer, the payment may be denied (or may not be authorized). This can occur, for example, when the user or sender inputs an incorrect PIN, or says an incorrect password, or the user's voice data otherwise could not be matched to stored voice sample data. As mentioned above, the call again goes live after depression of the pound key, which means that the "Hold" status ends and the line is un-muted, so that the user can again converse with his friend. However, in this case no payment has been made (because the mobile P2P payment failed). Thus, in some implementations, when the payment process fails the remote mobile P2P computer transmits a payment failed message to both the sender and the recipient, which payment failed message can be reviewed by the user or sender either after or during the telephone call. In some embodiments, such a payment failed message includes an indication of why the mobile payment failed (for example, payment was denied due to incorrect PIN entry or incorrect password entry). Thus, if the sender reviews the mobile P2P payment message during the call and thus finds out that the P2P payment failed, he may then again attempt to pay his friend by repeating the P2P payment process steps described above. Likewise, if the recipient or friend reviews the mobile P2P payment message during the call and finds out that the P2P payment was declined, she can bring this up during the call so that the sender can again try to pay her by repeating the mobile P2P voice payment process.

According to various exemplary embodiments, a P2P payment system or P2P payment network is provided and may include a plurality of senders, recipients, wallet providers, and a central P2P server computer which may be managed by and/or operated by a processing entity such as the assignee of the present application. For example, the central P2P server computer (and related components and/or devices) may be owned and/or operated by MasterCard International Incorporated. The central P2P server computer provides a point of contact for senders and recipients having mobile devices configured to transmit and/or accept P2P payments via their respective payment card accounts (or another type of financial account) which are in their digital wallets pursuant to the exemplary embodiments described herein.

FIG. 1 is a block diagram illustrating a person-to-person (P2P) mobile payment system 100 in accordance with some embodiments. Users or persons have mobile devices 102A to 102N configured for communication with each other via their various mobile network operators (MNOs) 104A to 104N. The system includes an application store 108 operably connected to the Internet 106 for communications with the mobile devices 102A to 102N, and operably connected to a mobile device application database 110A (which may store a plurality of mobile device applications) and a general applications database 110B. The P2P mobile payment system 100 also includes a mobile P2P server computer 112 operably connected to a P2P enrollment database 114. A payment network 116 is operably connected to the mobile P2P server computer 112 and to a plurality of Issuer financial institutions (FIs) 118A to 118N. In some implementations, the mobile P2P server computer 112, the payment network 116, and one or more of the Issuer FIs 118A-118N may also be operably connected to the Internet 106.

In some embodiments, in order to utilize the mobile device person-to-person (P2P) voice payment service, users or consumers or customers must first download a mobile P2P voice money transfer application and then enroll in the service. For example, a mobile device user opens a browser software application such that it is running or operating on his or her mobile device 102A and navigates to an application store 108 via the Internet 106. (It should be understood that the mobile devices 102B-102N may also be operable to communicate with the application store 108 via the Internet 106.) The application store 108 (which may be, for example, the iTunes™ store or the Android™ store) includes a plurality of mobile device applications stored in the mobile application database 110A and/or the general applications database 110B that are compatible with and/or configured for running on the operating system ("OS") resident on the user's mobile device 102A. The user then conducts a search for a mobile P2P voice money transfer application, which may be authorized by and/or compatible with his or her telecom operator (for example, AT&T© or Verizon©), and which is compatible with one or more voice over Internet protocol (VOIP) applications. Such a mobile P2P voice money transfer application may be provided by and/or supported by a payment processing entity, such as MasterCard International Incorporated. For example, the user may search for and find a "MasterVoiceTransfer©" ("MVT") mobile payment application written by and/or supported by MasterCard International Incorporated. The MVT mobile payment application is compatible with the user's mobile device, can be authorized for use by the user's MNO or telecom carrier, and can also be used in concert with messaging applications that utilize the Internet (for example, a person may utilize a VOIP application such as "WhatsApp™" and/or "Skype™" (which rely on data) to talk to another person, and such VOIP applications also typically allow users to text, chat, and share media such as video, with other individuals or groups).

After downloading the mobile P2P voice money transfer application onto her mobile device 102A, the user then initiates it (or opens the application) typically by touching an icon on the touch screen of her mobile device that represents the mobile P2P voice money transfer application. In some embodiments, a mobile P2P user interface is then displayed, which may be generated by one or more applications executing on the mobile device, for example, a payment application, a wallet application, and the like in accordance with instructions provided by the mobile P2P voice payment application.

In some implementations, the mobile P2P voice money transfer application recognizes when it is opened for the first time, and thus the mobile P2P user interface provides or displays instructions for the user to enroll or register for the mobile P2P voice money transfer service. In some implementations, enrollment is required, and the enrollment process includes prompting the user to provide security data by utilizing a keypad or a touch screen (not shown) of the mobile device to select and enter a confidential four-digit (4-digit) personal identification number (PIN), and then to press an enter key or submit icon. The user may then next be instructed to think of an "easy to remember" audio or voice password, which can be a word or a phrase (such as "dog" or "red pen") that the user will have to verbalize. In some implementations, the user is prompted to provide an audio sample or voice sample of the selected voice password (the word or phrase) by saying it into a microphone (not shown) of her mobile device. For example, the user may be provided with audible instructions (or text instructions, for example, appearing on the mobile device touch screen) stating: "Please press the pound key and say your audio password into the microphone." The mobile P2P voice money transfer application may be configured to temporarily store the user's security data (which includes the 4-digit PIN (numeric data) and the audio password (voice data) of the user verbalizing the secret word or secret phrase). Thus, the mobile P2P payment system utilizes a PIN, a password (which can be a word or phrase selected by senders), and voice sample data to authenticate senders who utilize the mobile P2P voice payment service.

Next, the user is prompted to select the mobile wallet the user would like to use for mobile P2P payments from amongst the multiple wallets that the user may already have mapped to his or her unique mobile telephone number. When the user finishes selection of the mobile wallet for use in making mobile P2P payments, in some implementations the mobile P2P voice money transfer application then requests permission from the user to run on the mobile device at all times in the background (which request is made so that the mobile P2P voice money transfer application can monitor for entry of the "star" ("*") key during mobile telephone calls, wherein the star key entry activates the mobile P2P voice money transfer process). Lastly, in some implementations the mobile P2P voice money transfer application also requests the user to provide permission for the mobile P2P voice money transfer application to share the user's mobile telephone number and the recipient's mobile telephone (being used in a current call) with one or more VOIP messaging applications (which utilize the Internet), for use when the user utilizes such a messaging application and wishes to conduct the mobile P2P payment process to pay another mobile device user on such a VOIP call.

Once the enrollment process has been completed, the mobile P2P voice money transfer application transmits the security data, the selected mobile wallet data (which may, for example, include a selection of a mobile wallet storing a payment card account for making the mobile P2P payments), and the permission(s) data to the mobile P2P server computer 112. In some implementations, the mobile P2P voice money transfer application also causes the temporarily stored security data (the 4-digit PIN and the voice data of the user verbalizing the password (the secret word or secret phrase) to be erased from memory of the user's mobile device 102A.

Referring again to FIG. 1, upon receipt of the enrollment data (which includes the user's security data, the user's selected mobile wallet data, and permissions data), the mobile person-to-person (P2P) server 112 stores it in the P2P enrollment database 114 for use in conducting future mobile P2P voice money transfers for that user. The mobile P2P server 112 may then transmit a message to the user's mobile device 102C indicating successful enrollment in the mobile P2P voice money transfer service. In some embodiments, both a sender and a receiver of a mobile P2P voice money transfer must be enrolled in the P2P mobile payment system service in order for mobile P2P voice money transfers to take place. Thus, in some embodiments, the mobile P2P server computer 112 receives a P2P payment request from a user's or sender's mobile device 102C via the second mobile network operator (MNO_2) 104B while that sender is conducting a telephone conversation with another person (or the intended recipient) who is operating the mobile device 102B. In accordance with some embodiments, the P2P payment request includes the sender's security data, a payment amount (an amount of money to be transferred from the sender's mobile wallet to the recipient's mobile wallet), and the recipient's mobile telephone number. The mobile P2P computer 112 then locates and/or matches the recipient mobile telephone number to one stored in the mobile P2P enrollment database 110A, and then finds the wallet account that has been designated and/or selected by the recipient for making and receiving P2P voice mobile device payments. When the sender's security data matches stored security data of that user (which includes the sender's PIN, password and voice sample data), the mobile P2P computer generates a sender authentication message. Next, the mobile P2P computer 112 generates and transmits a P2P payment authorization request to the payment network 116, wherein the P2P payment authorization request includes the sender authentication message, the transaction amount, sender wallet account data, and recipient wallet account data. The payment network 116 determines which of the Issuer FIs 118A to 118N is associated with the sender's wallet account data, and then transmits a payment authorization request to that Issuer FI (for example, Issuer FI 118B) to ensure that the sender, for example, has adequate funds or credit in his or her mobile wallet (which may be associated with, for example, a payment card account issued by that issuer to the sender) to cover the mobile P2P payment amount. If so, the Issuer FI 118B transmits a payment authorization message to the payment network 116. The payment network then conducts the funds transfer (not shown) or payment between the sender's Issuer FI 118B and the recipient's Issuer FI 118A so that the money is transferred (or payment is made) in real time (substantially immediately and during the telephone call between the sender and the recipient) to the recipient's mobile wallet.

The payment network 116 also forwards a mobile P2P payment message to the mobile P2P computer 112, which message may indicate or confirm that payment has been completed from the sender's mobile wallet to the recipient's mobile wallet. As mentioned above, in some cases the mobile P2P payment message may indicate that the mobile payment process failed, and thus has not been completed. In either case, in accordance with some embodiments, the mobile P2P computer 112 transmits the mobile P2P payment message to both the sender's mobile device 102C and to the recipient's mobile device 102B in substantially real-time. Thus, if the mobile P2P payment message indicates that the mobile payment failed, and if the telephone call is still ongoing then the user (sender) may try again to transfer money to the recipient by repeating the process described herein.

Figure 2:
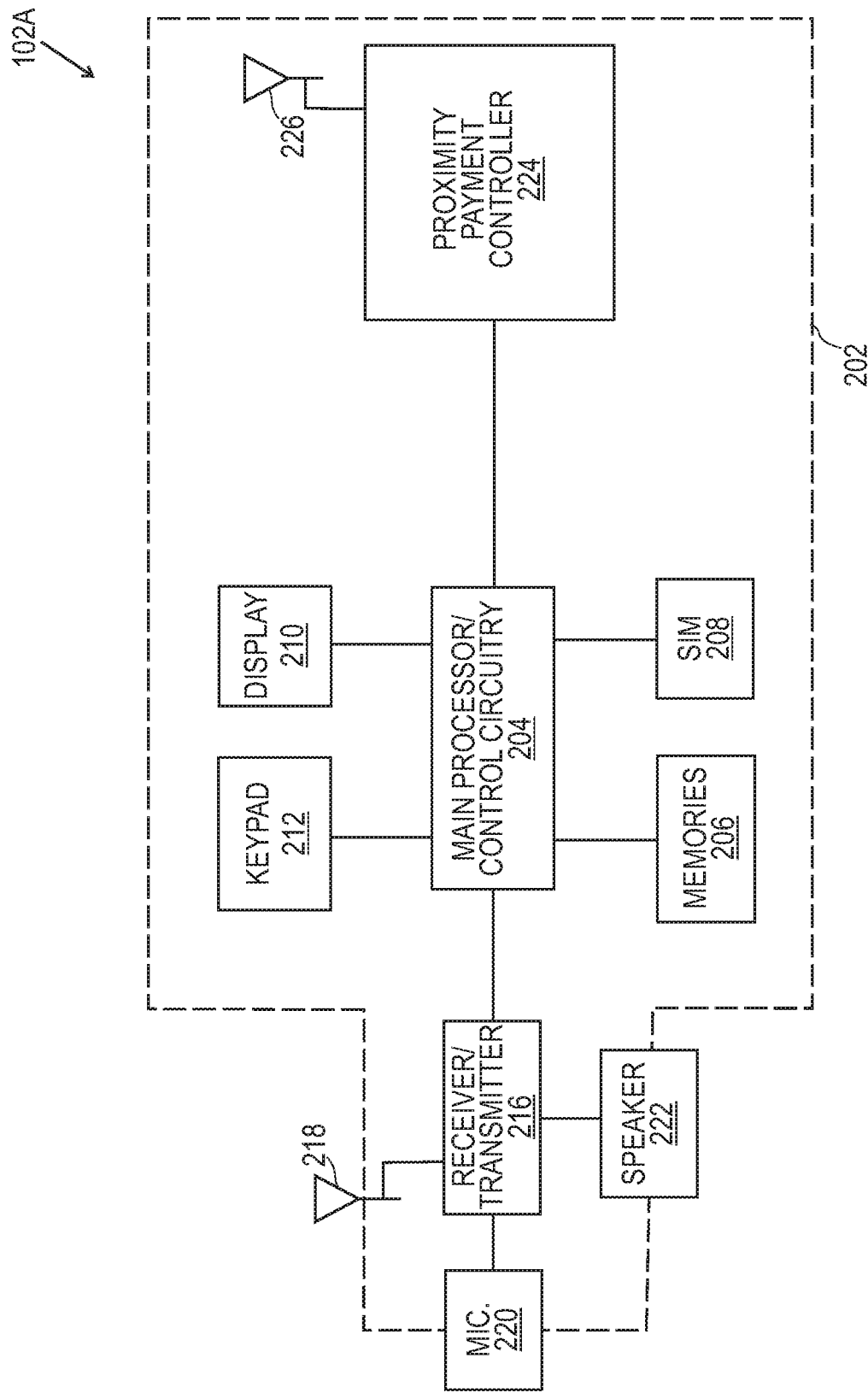
FIG. 2 is a block diagram illustrating an example of a mobile device in accordance with some embodiments of the disclosure.

FIG. 2 illustrates components of a user's mobile device 102A in accordance with an exemplary embodiment. For example, the user's mobile device 102A may be a mobile telephone, a tablet computer, a laptop computer, a phablet, a smart watch, a portable smart appliance, a wearable digital exercise device, and the like. Referring to FIG. 2, the mobile device 102A may include a conventional housing (indicated by dashed line 202 in FIG. 2) that contains and/or supports the other components of the mobile device 102. The housing 202 may be shaped and sized to be held in a user's hand, and may for example fit in the palm of the user's hand. However, in some embodiments, the housing 202 may have a different form factor (e.g., as a tablet computer, key fob or the like).

The mobile device 102A may include control circuitry 204, which may be a mobile device processor, for controlling the over-all operation of the mobile device 102A. For example, the control circuitry 204 or mobile device processor may include one or more processing devices, for example, a multicore processor, a reconfigurable multicore processor, and the like. Other components of the mobile device 102A, which are in communication with and/or controlled by the control circuitry 204, include storage devices or memory devices 206 (e.g., program and/or working memory, etc.), a SIM (subscriber identification module) card 208, a keypad 212 for receiving user input (which may be a simulated keypad, for example, on a touch screen of a Smartphone), and a display component 210 which may include a display screen (or touch screen) for displaying output information to the user (and in some implementations, for accepting input from a user). Accordingly, in some embodiments the keypad 212 may include a conventional 12-*key* telephone keypad, in addition to other buttons, switches and keys, such as a rocker-switch/select key combination, soft keys, and send and end keys. In another example, the keypad 212 may be a digital keypad provided on a touch screen of the mobile device 102A.

The mobile device 102A may also include receive/transmit circuitry 216 that is in communication with and/or controlled by the control circuitry 204. The receive/transmit circuitry 216 is coupled to an antenna 218 and may provide the communication channel(s) by which the mobile device 102A communicates via one or more communications networks (for example, the MNOs 104A-104N and/or the Internet 106, as shown in FIG. 1). The receive/transmit circuitry 216 may operate both to receive and transmit voice signals, in addition to performing data communication functions, such as GPRS (general packet radio service) communications, and the like. For example, the receive/transmit circuity 216 may connect the mobile device 102A to a network such as the Internet, a cellular network, and the like. Accordingly, a user may control the mobile device 102A to navigate to websites on the Internet, download mobile applications, view content, and the like.

The mobile device 102A may further include a microphone 220, coupled to the receive/transmit circuitry 216. The microphone 220 may receive voice input from the user of the mobile device 102A. In addition, a loudspeaker 222 is included to provide sound output to the user, and is coupled to the receive/transmit circuitry 216. Thus, the receive/transmit circuitry 216 may transmit, via the antenna 218, voice signals generated by the microphone 220, and reproduce, via the loudspeaker 222, voice signals received via the antenna 218. The receive/transmit circuitry 216 may also handle transmission and reception of text messages, video streams, mobile applications, and/or other data communications via the antenna 218.

In some embodiments, the mobile device 102A may include a payment circuit 224 and a loop antenna 226, coupled to the payment circuit 224. The payment circuit 224 may include functionality that allows the mobile device 102A to function as a contactless payment device. In some embodiments, the payment circuit 224 includes a payments processor (not separately shown) and a memory (not separately shown) that is coupled to the main processor 204 and stores program instructions for controlling the main processor 204. Although shown as separate from the main processor 204, the payment circuit 224 and/or its processor component may be integrated with the main processor 204.

In accordance with some embodiments, the mobile device 102A may include a "secure element" or "secure storage element" (not separately shown), which may be incorporated with the memories 206, the payment circuit 224, the main processor 204, the SIM card 208, and/or the like. As is familiar to those who are skilled in the art, the secure element may include a microprocessor and volatile and/or nonvolatile memory that are secured from tampering and/or reprogramming by suitable measures. The secure element may, for example, manage functions such as storing one or more digital wallets and reading out a payment card account number and the like. As an example of a secure element, the mobile device 102A may include a trusted platform module (TPM) which may be configured for secure cryptographic processing and storage. The TPM may provide a trusted or secured application execution environment or a trusted execution environment. The trusted area may have enhanced security restrictions and limit the amount of programs that have access to the storage and programs therein.

Figure 3:
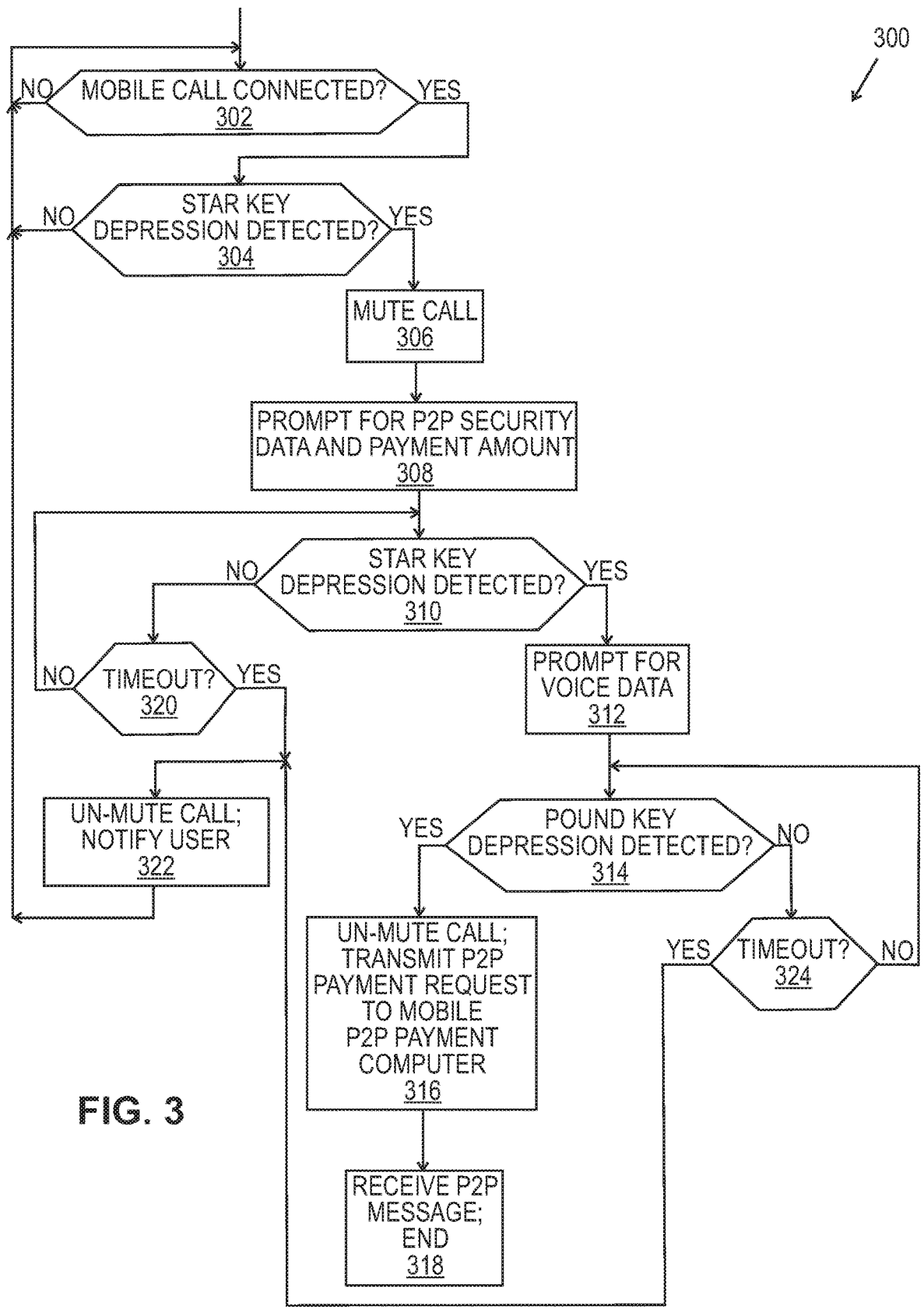
FIG. 3 is a flowchart of a P2P mobile voice payment process in accordance with some embodiments.

FIG. 3 is a flowchart of a mobile P2P voice payment process 300 from the point of view of the user of a mobile device processor (of a user's mobile device) running a mobile P2P voice payment application in accordance with some embodiments. In particular, as mentioned earlier, the user downloads the mobile P2P voice money transfer application onto his or her mobile device and then enrolls in the mobile P2P voice money transfer service. In some implementations, during enrollment the user gave the mobile P2P voice money transfer application permission to run in the background, and thus when a mobile device telephone call is ongoing 302, the P2P voice money transfer application causes the mobile device processor to monitor 304 for depression of the star key ("*") by the user. When the star key is not depressed, then the mobile P2P voice payment process branches back to step 302 and continues to monitor for depression of the star key during the telephone call.

When the mobile device processor detects 304 a first star key depression by the user (the sender), the mobile device processor mutes 306 the mobile telephone call, and then prompts 308 the sender to enter P2P security data and a transaction amount. In some embodiments, the P2P security data is a 4-digit personal identification number (PIN), but it should be understood that the PIN could be of shorter or longer lengths. (It should also be understood that, in some embodiments, a portion of the mobile P2P security data could be a form of biometric data provided by the user, such as facial recognition data using the mobile device camera, fingerprint data using a fingerprint scanner, or the like.) Thus, when the call is muted the recipient cannot hear anything that the sender is doing on his end of the line. The prompt to enter the mobile P2P security data may include text instructions which direct the user, for example, to enter his 4-digit PIN followed by the monetary amount of the payment transaction. For example, the user may enter "4692" as his PIN, and then enter 18.62 (eighteen dollars and sixty-two cents) as the payment amount for the mobile P2P payment. The mobile device processor then monitors 310 for a second depression of the star key ("*") by the user. If the star key depression is not detected and if a timeout period has not expired in step 320, then the process branches back to step 310 to continue monitoring for that second star key depression. Such a timeout period may have, for example, a ten second expiration time, or a sixty second expiration time (or any other reasonable expiration time), and the expiration time may be preset by the entity providing the mobile P2P voice money transfer application and/or operating the mobile P2P voice money transfer service. In some implementations, the expiration time is selected to be one for which the user can reasonably enter or input the requested information. Thus, if the mobile device processor determines 320 that the time out period expired, then the mobile telephone call is unmuted 322 and the user or sender is notified. The process then branches back to steps 302 and 304 wherein the mobile device processor continues to monitor the mobile telephone call for a first depression of the star key to repeat or re-start the mobile P2P payment process. In some embodiments, the user is notified of the expiration of the time out period by a P2P payment failure message that is displayed on a display screen of the mobile device by the mobile device processor.

Referring again to FIG. 3, when the second star key depression is detected in step 310, then the mobile device processor prompts 312 the sender for voice data. As mentioned above, in some embodiments the user's security data includes a personal identification number (PIN) and a password (which was audibly provided by the user to the mobile P2P computer during the enrollment process and stored as a voice sample of the password). After prompting the user for the password (voice data), the mobile device processor monitors 314 for entry of the pound key ("#") by the sender. When the pound key is detected, then the mobile device processor un-mutes 316 the mobile telephone call so that the sender of the mobile P2P payment can continue to converse or talk with the recipient, and transmits a P2P payment request to the mobile P2P computer. In some embodiments, the P2P payment request includes the sender security data, the transaction amount, sender wallet account data, and a recipient mobile telephone number. Next, the mobile device processor receives 318 a mobile P2P payment message from the P2P server that indicates either that the mobile payment was successful or that it failed. Thus, the mobile P2P payment message may be a payment confirmation message (if the P2P payment request was authorized), or may be a mobile P2P payment denied message (for example, if the P2P payment request was denied by the sender's issuer or denied by the P2P payment computer).

The mobile P2P payment message may be in the form of a text message, an SMS message, a notification alert, an email, or any other type of message sent to the user's phone which the user (sender) can check during the call. In addition, in some embodiments a mobile P2P payment failure message may include an indication regarding the reason(s) why the mobile P2P payment failed. For example, the mobile P2P payment failure message may state that the sender's issuer denied the mobile payment, or that the mobile P2P computer denied the mobile payment because one or more portions of the sender's security data could not be verified and/or authenticated. For example, the mobile P2P computer may deny a mobile payment if the user entered an incorrect PIN and/or the user's audio data (the user's voice data) did not match the stored voice sample data associated with the user's secret word or secret phrase (the password).

Referring again to FIG. 3, if in step 314 the pound key depression is not detected, and if a voice data timeout period 324 expires, then the mobile device processor un-mutes the call 322 and notifies the user that the P2P payment transaction did not occur. (The voice data timeout period may be the same or similar to the timeout period described above that is used when monitoring for depression of the star key.) Such a notification may be in the form of a pop-up message on the display screen of the user's mobile device or the like, which may indicate that the voice data was not input correctly. The notification could also be in the form of an audible warning or message from the mobile device processor that the sender can hear being emitted from the mobile device speaker, which may announce that the voice data time out period expired and/or that the mobile P2P payment failed. The mobile P2P voice payment transaction process then branches back to steps 302 and 304 to monitor the telephone call for another first depression of the stare key to see if the sender wishes to repeat the mobile P2P payment process.

It should be understood that the mobile P2P voice money transfer application can be configured to operate in the currency type of the country in which the user enrolled his mobile device. Thus, if the user enrolled his or her mobile device in the United States then the currency type would be in U.S. dollars, whereas a user enrolling his or her mobile device in Europe then the currency type would be in Euros. However, if the user is travelling then in some implementations the mobile P2P voice money transfer application is operable to detect the person's location (for example, using global positioning circuitry (GPS) of the user's mobile device) and can prompt the user for permission to convert money amounts to the relevant foreign currency for the duration of the trip. In another scenario, if a user in the United States is speaking with a friend in Europe and wished to make a mobile P2P voice money transfer payment, the mobile P2P voice money transfer application initiates the mobile payment in U.S. dollars (which is the currency the sender enrolled with) but a Euro amount would be transferred to the friend in Europe (because that is the currency that the friend enrolled with). In this case, the exchange rate (from U.S. dollars to Euros) at the time of the telephone call (and the mobile P2P payment) would apply. Thus, in some implementations an international P2P money transfer may be possible utilizing the mobile P2P voice money transfer application if the sender's issuing bank has agreements in place to convert money amounts from one type of currency to another.

The embodiments disclosed herein include multiple advantages, for example, quick and convenient payment from a first person to a second person in substantially real-time during a telephone call using their mobile devices, so that payment to the second person (the recipient) can quickly be made at the time, for example, when the first person (the sender) is reminded of money that is owed to that second person (the recipient). In accordance with described embodiments, the safety of such person-to-person (P2P) transactions is ensured through use of a secure four digit (4-digit) password or PIN in combination with a secret word or phrase, and further by requiring the sender to verbally state the secret word or phrase for voice matching by a remote P2P server computer. Thus, an enrollment process for the mobile device voice P2P payment feature requires the user to first upload a sample of his or her voice (saying the secret word or phrase) before making any mobile P2P payments (by using the mobile P2P voice payment application) in addition to providing a 4-digit personal identification number, to reduce fraud. Advantageously, the disclosed methods work for both voice over Internet protocol ("VOIP") and operator or voice calling systems (such as cellphone calls). Since the process requires information about the mobile telephone numbers of both parties (the sender and the recipient) to complete the P2P payment transaction (which both forms of voice calling can provide), user's provide permission for their mobile telephone numbers to be provided to Internet-based messaging applications (which otherwise may not have access to such data).

Thus, pursuant to the disclosed embodiments, P2P payments performed using the disclosed methods and systems provide improved security and convenience for users (persons) who wish to conduct secure P2P payment transactions using their mobile devices. Moreover, the use of several cardholder verification methods (CVMs), such as requiring entry of a personal identification number (PIN) and vocalization of a pre-set secret phrase or word, provides improved security as well as a desirable and efficient payment transaction flow.

As used herein, components and/or devices, including those associated with the P2P mobile device payment processing system and any other device described herein, may exchange information via a communication network, which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

As used herein, the terms card, transaction card, financial transaction card, payment card, and the like, refer to any suitable transaction card or account, such as a credit card, a debit card, a prepaid card, a charge card, a membership card, a promotional card, a frequent flyer card, an identification card, a gift card, a deposit account, and the like. As another example, the terms may refer to any other device or media that may hold payment account information, such as mobile phones, Smartphones, tablet computers, personal digital assistants (PDAs), key fobs, laptop computers, and the like. Pursuant to some embodiments, "tokenized" account information may be used. For example, payment card data may be "tokenized" pursuant to the MasterCard Digital Enablement Service ("MDES") or the like.

Also, the term "payment card system" refers to a system that may include a switch for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations. A number of trademark or brand names are used in the drawings and the specification to refer to example products, and it is the applicant's intent to provide proper attribution to those trademark owners.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in an assembly language and/or machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. In addition, one or more of the steps may not be required for performance in some embodiments.

Although the present invention has been described in connection with specific exemplary embodiments, it should be understood that various changes, substitutions, and/or alterations which may be apparent to those skilled in the art can be made without departing from the spirit and scope of the invention as set forth in the appended claims.

What is claimed is:

1. A mobile device based person-to-person voice payment method, comprising:

detecting, by a mobile device processor of a caller's mobile device running a mobile person-to-person (P2P) voice money application in the background of a mobile telephone call, a first key entry by the caller during the mobile telephone call with a recipient, wherein the recipient's mobile device is also running the P2P voice money application in the background of the mobile telephone call, wherein the caller and the recipient are each enrolled in a P2P mobile payment service which provides the P2P voice money application for download to the mobile devices of the caller and recipient, wherein the mobile payment service comprises a mobile P2P computer operably connected to a P2P enrollment database, and wherein enrollment comprises selecting a mobile wallet for use in making P2P voice money payments, and wherein enrollment further comprises giving permission for the mobile telephone numbers of the caller and the recipient to be provided to Internet-based messaging applications running on the mobile devices of the caller and the recipient, wherein the caller and recipient are each consumers and customers of a mobile network operator who has authorized the use of the P2P voice money application;

activating, by the mobile device processor of the caller's mobile device, in response to the first key entry, a mobile P2P money transfer process configured for transferring money from the selected mobile wallet of the caller directly to the selected mobile wallet of the recipient during the mobile telephone call, wherein the mobile wallet of the caller and recipient are associated with a credit card payment network which is in communication with a respective issuer of credit to the caller and the recipient, whereby the issuers of credit carry out the money transfer process using the payment network;

automatically muting, by the mobile device processor running the mobile P2P voice money application, the mobile telephone call without disconnecting the call such that the recipient cannot hear any input from the caller;

prompting, by the mobile device processor running the mobile P2P voice money application, the caller to enter a personal identification number (PIN) and a payment amount;

receiving, by the mobile device processor running the mobile P2P voice money application, the PIN and the payment amount from the caller;

displaying, by the mobile device processor on a display screen of the mobile device, the PIN and the payment amount;

detecting, by the mobile device processor running the mobile P2P voice money application, a second key entry by the caller indicating that the payment amount is correct;

in response to the second key entry audibly prompting, by a speaker operably connected to the mobile device processor running the mobile P2P voice money application, the caller to provide voice data associated with a password;

receiving, via a microphone operably connected to the mobile device processor running the mobile P2P voice money application, voice data from the caller;

detecting, by the mobile device processor running the mobile P2P voice money application, a third key entry indicating that the caller finished providing voice data;

transmitting, in response to the third key entry by the mobile device processor running the mobile P2P voice money application to the mobile person-to-person (P2P) computer, a P2P payment request comprising the PIN, the payment amount, the voice data of the caller, caller account data, and a recipient mobile telephone number being used in the current call for use by the mobile P2P computer to generate and transmit a P2P payment authorization request to a payment network;

automatically unmuting, by the mobile device processor running the mobile P2P voice money application, the mobile telephone call thus continuing the call between the caller and the recipient; and receiving, by the mobile device processor of the caller's mobile device running the mobile P2P voice money application, using the Internet-based messaging application running on the mobile device of the caller, from the mobile P2P computer during the mobile telephone call with the recipient, a P2P payment message.

2. The method of claim 1, wherein the first and second key entries comprise entry of a star key, and the third key entry comprises entry of a pound key.

3. The method of claim 1, further comprising displaying, by the mobile device processor, the P2P payment message on a display screen of the mobile device during the telephone call.

4. The method of claim 3, wherein the P2P payment message comprises a payment failed message.

5. The method of claim 4, wherein the payment failed message comprises an indication concerning why the P2P payment failed.

6. The method of claim 1, wherein the voice data of the password comprises one of a secret word or a secret phrase.

7. The method of claim 1, further comprising, prior to detecting the second key entry by the caller:
determining, by the mobile device processor, that a time out period expired;
unmuting, by the mobile device processor, the mobile telephone call; and
displaying, by the mobile device processor on a display screen of the mobile device, a P2P payment failure message.

8. The method of claim 1, further comprising, prior to detecting the third key entry by the caller:
determining, by the mobile device processor, that a voice data time out period expired;
unmuting, by the mobile device processor, the mobile telephone call; and
displaying, by the mobile device processor on a display screen of the mobile device, a P2P payment failure message.

9. A mobile device comprising:
a mobile device processor;
a display component operably connected to the mobile device processor;
a keypad operably connected to the mobile device processor;
receive/transmit circuitry operably connected to the mobile device processor;
a speaker operably connected to the mobile device processor;
a microphone operably connected to the receive/transmit circuitry; and
a storage device operably connected to the mobile device processor, wherein the storage device comprises a mobile person-to-person (P2P) voice money application running in the background and configured to cause the mobile device processor to:
detect a first key entry by a caller on the keypad during a mobile telephone call with a recipient, wherein the recipient's mobile device is also running the P2P voice money application in the background of the mobile telephone call, and wherein the caller and the recipient are each enrolled in a P2P mobile payment service which provides the P2P voice money application for download to the mobile devices of the caller and recipient, wherein the mobile payment service comprises a mobile P2P computer operably connected to a P2P enrollment database, and wherein enrollment comprises selecting a mobile wallet for use in making P2P voice money payments, and wherein enrollment further comprises giving permission for the mobile telephone numbers of the caller and the recipient to be provided to Internet-based messaging applications running on the mobile devices of the caller and the recipient, wherein the caller and recipient are each consumers and customers of a mobile network operator who has authorized the use of the P2P voice money application;
activate, in response to the first key entry, a mobile P2P money transfer process for transferring money from the selected mobile wallet of the caller directly to the selected mobile wallet of the recipient during the mobile telephone call, wherein the mobile wallet of the caller and recipient are associated with a credit card payment network which is in communication with a respective issuer of credit to the caller and the recipient, whereby the issuers of credit carry out the money transfer process using the payment network;

automatically mute the mobile telephone call to prevent communication via the receive/transmit circuitry with the recipient without disconnecting the call, wherein the caller and the recipient are enrolled in a P2P mobile payment service associated with a mobile P2P computer operably connected to a P2P enrollment database and provided permission for their mobile telephone numbers to be provided to Internet-based messaging applications;

prompt the caller to enter a personal identification number (PIN) and a payment amount;

receive the PIN and the payment amount from the caller;

display the PIN and the payment amount on the display component;

detect a second key entry on the keypad by the caller indicating that the payment amount is correct;

in response to the second key entry, audibly prompt via the speaker the caller to provide voice data associated with a password by speaking into the microphone;

receive the voice data from the caller;

detect a third key entry on the keypad by the caller, the third key entry indicating that the caller finished providing voice data;

transmit, in response to the third key entry via the receive/transmit circuitry to the mobile person-to-person (P2P) computer, a P2P payment request comprising the PIN, the payment amount, the voice data of the caller, caller account data, and a recipient mobile telephone number being used in the current call for use by the mobile P2P computer to generate and transmit a P2P payment authorization request to a payment network;

automatically unmute the mobile telephone call thus continuing the call between the caller and the recipient; and receive via the receive/transmit circuitry, using the Internet-based messaging application running on the mobile device of the caller and during the mobile telephone call with the recipient a P2P payment message from the mobile P2P computer.

10. The apparatus of claim 9, wherein the storage device comprises further instructions configured to cause the mobile device processor to display the P2P payment message on the display component during the telephone call.

11. The apparatus of claim 9, wherein the instructions are configured to cause the mobile device processor to display a payment failure message comprising at least one indication of why the P2P payment failed.

12. The apparatus of claim 9, wherein the storage device comprises, prior to the instructions for detecting the second key entry by the caller, further instructions configured to cause the mobile device processor to:

determine that a time out period expired;
unmute the mobile telephone call; and
display a P2P payment failure message on the display screen of the mobile device.

13. The apparatus of claim 9, wherein the storage device comprises, prior to the instructions for detecting third key entry by the caller, further instructions configured to cause the mobile device processor to:

determine that a voice data time out period expired;
unmute the mobile telephone call; and
display a P2P payment failure message on the display screen of the mobile device.

14. A mobile person-to-person (P2P) voice payment system comprising:

a caller mobile device of a caller configured for conducting telephone calls;

a recipient mobile device of a recipient configured for conducting telephone calls;

a mobile person-to-person (P2P) computer operably connected to the caller mobile device and the recipient mobile device;

a payment network operably connected to the mobile P2P computer and to a plurality of issuer financial institutions (FIs);

wherein the caller mobile device comprises a mobile device processor operably connected to a storage component, a key pad, a display component, a microphone, a speaker and receive/transmit circuitry, and wherein the storage device comprises a mobile P2P voice money application running in the background and configured to cause the mobile device processor to:

detect a first key entry by a caller on the keypad during a mobile telephone call with a recipient, wherein the recipient's mobile device is also running the P2P voice money application in the background of the mobile telephone call, and wherein the caller and the recipient are each enrolled in a P2P mobile payment service which provides the P2P voice money application for download to the mobile devices of the caller and recipient, wherein the mobile payment service comprises a mobile P2P computer operably connected to a P2P enrollment database, and wherein enrollment comprises selecting a mobile wallet for use in making P2P voice money payments, and wherein enrollment further comprises giving permission for the mobile telephone numbers of the caller and the recipient to be provided to Internet-based messaging applications running on the mobile devices of the caller and the recipient, wherein the caller and recipient are each consumers and customers of a mobile network operator who has authorized the use of the P2P voice money application;

activate, in response to the first key entry, a mobile P2P money transfer process for transferring money from the selected mobile wallet of the caller directly to the selected mobile wallet of the recipient during the mobile telephone call, wherein the mobile wallet of the caller and recipient are associated with a credit card payment network which is in communication with a respective issuer of credit to the caller and the recipient, whereby the issuers of credit carry out the money transfer process using the payment network;

automatically mute the mobile telephone call to prevent communication via the receive/transmit circuitry with the recipient without disconnecting the call, wherein the caller and the recipient are enrolled in a P2P mobile payment service associated with a mobile P2P computer operably connected to a P2P enrollment database and provided permission for their mobile telephone numbers to be provided to Internet-based messaging applications;

prompt the caller to enter a personal identification number (PIN) and a payment amount;

receive the PIN and the payment amount from the caller;

display the PIN and the payment amount on the display component;
detect a second key entry on the keypad by the caller indicating that the payment amount is correct;
in response to the second key entry, audibly prompt via the speaker the caller to provide voice data associated with a password by speaking into the microphone;
receive the voice data from the caller;
detect a third key entry on the keypad by the caller, the third key entry indicating that the caller finished providing voice data;
transmit, in response to the third key entry via the receive/transmit circuitry to the mobile person-to-person (P2P) computer, a P2P payment request comprising the PIN, the payment amount, the voice data of the caller, caller account data, and a recipient mobile telephone number being used in the current call for use by the mobile P2P computer to generate and transmit a P2P payment authorization request to a payment network;
automatically unmute the mobile telephone call thus continuing the call between the caller and the recipient; and
receive via the receive/transmit circuitry during the mobile telephone call with the recipient a P2P payment message from the mobile P2P computer,
receive via the receive/transmit circuitry, using the Internet-based messaging application running on the caller mobile device and during the mobile telephone call with the recipient a P2P payment message from the mobile P2P computer.

\* \* \* \* \*